C. E. FOURMAN.
CHILD'S VEHICLE.
APPLICATION FILED SEPT. 27, 1909.

958,914.

Patented May 24, 1910.

Witnesses
L. Carl Stoughton.
A. L. Phelps

Inventor
Colonel E. Fourman
By D. Shepherd
Attorney

UNITED STATES PATENT OFFICE.

COLONEL E. FOURMAN, OF COLUMBUS, OHIO.

CHILD'S VEHICLE.

958,914.  Specification of Letters Patent.  Patented May 24, 1910.

Application filed September 27, 1909. Serial No. 519,779.

*To all whom it may concern:*

Be it known that I, COLONEL E. FOURMAN, a citizen of the United States, residing at Columbus, in the county of Franklin and State of Ohio, have invented certain new and useful Improvements in Children's Vehicles, of which the following is a specification.

Figure 1:
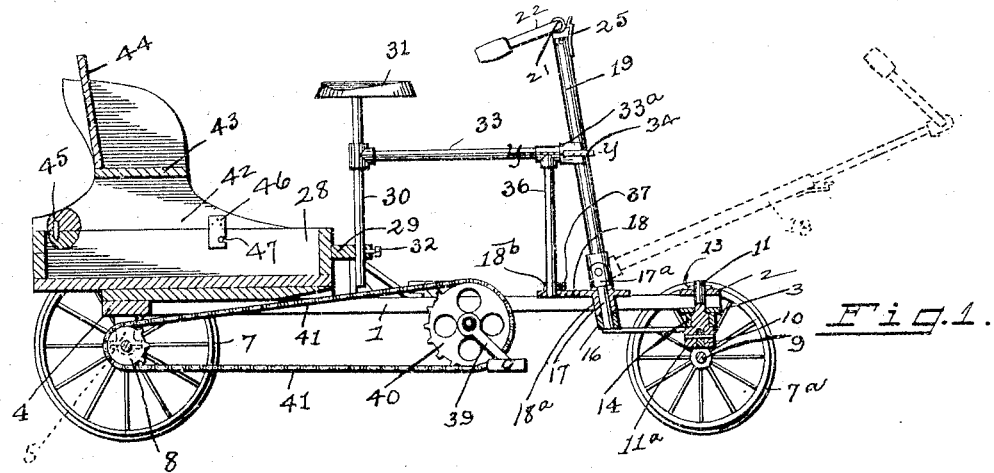
Figure 2:
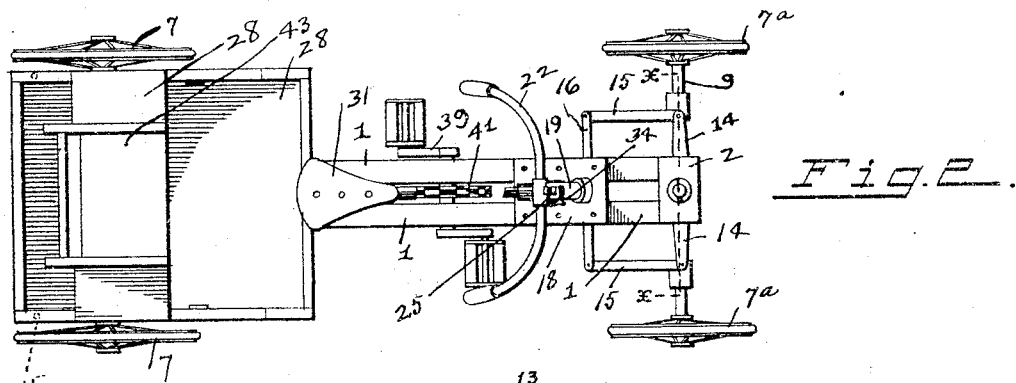
Figures 3, 4, 5, 6:
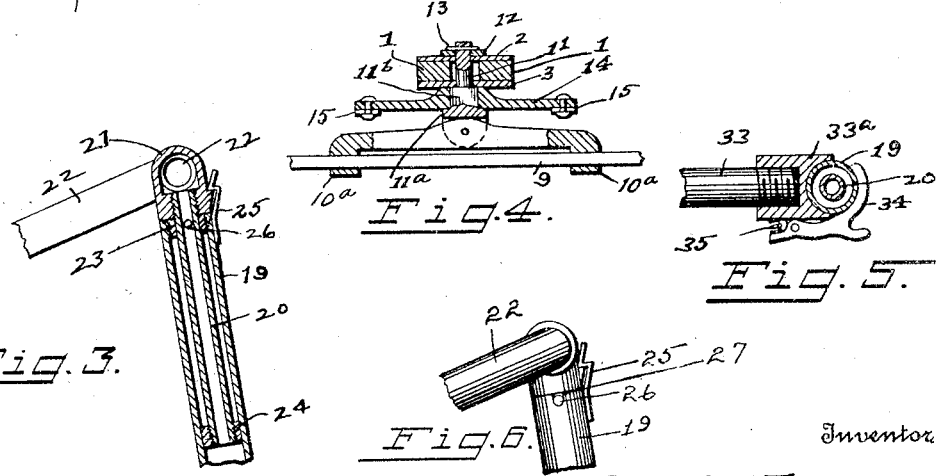

My invention relates to the improvement of child's vehicles and the objects of my invention are to provide a child's vehicle of improved construction; to so construct the vehicle as to admit of its being propelled by foot power or drawn by hand; to provide an improved construction of steering post and means for utilizing the same as a drawing tongue or handle; to provide my improved vehicle with an improved construction of framework, which will insure strength and durability and to produce other improvements the details of which will be more fully pointed out hereinafter. These objects I accomplish in the manner illustrated in the accompanying drawing, in which:

Figure 1 is a central longitudinal section of my improved vehicle, Fig. 2 is a plan view, Fig. 3 is an enlarged vertical section through a portion of the steering post, Fig. 4 is an enlarged sectional view on line $x$—$x$ of Fig. 2, Fig. 5 is an enlarged transverse section of the steering post on line $y$—$y$ of Fig. 1, and, Fig. 6 is an enlarged view in elevation of the upper end portion of the steering post.

Similar numerals refer to similar parts throughout the several views.

In carrying out my invention, I provide a horizontal reach frame, which comprises two horizontally disposed parallel bars 1, the forward ends of said bars being united on their upper sides by a plate 2 and on their lower sides by a corresponding plate 3. The rear ends of the reach or coupling bars 1 are connected by a transverse frame bar 4. From this frame bar 4, depend suitable bearing arms or hangers 5 in which is journaled the rear axle 6. Upon the end spindles of this axle, are mounted rear ground wheels 7, one of these ground wheels being rigidly connected with the axle and the other rotatable therewith. Upon the rear axle is carried a small sprocket wheel 8.

9 represents the front axle of the vehicle, which is journaled in the downturned end portions $10^a$ of a front bolster bar 10, the horizontal body of which extends above and parallel with the front axle. Upon this front axle are mounted the front ground wheels $7^a$. At the center of its length, the bar 10 is embraced by and pivotally connected with the bifurcated enlarged lower end $11^a$ of a connecting bolt 11. The upper portion of this bolt, as indicated, is of a rounded pin form in cross section and that portion which is immediately above the enlarged lower end $11^a$ is squared as indicated at $11^b$. As shown, the rounded upper portion of the bolt 11 passes loosely between the reach bars 1 and between vertical opposing openings in the plates 2 and 3, the reach bar being thus held in connection with said bolt through the medium of an upper side washer 12 and a locking pin 13.

As shown in the drawing, the lower plate 3 bears upon the shoulder formed by the upper side of the squared member $11^b$ of the bolt, said squared bolt portion passing through the correspondingly shaped central opening in the forward horizontal bar 14 of a steering frame. In addition to the bar 14 the steering frame comprises rearwardly extending arms 15, the forward ends of which are pivoted to the ends of the bar 14 and a connecting bar 16, the ends of which are pivotally connected to the rear ends of said bars 15. This bar 16 has connected therewith at the center of its length, the lower end of an upwardly extending pin 17 which has an enlarged bifurcated head $17^a$. The body of the pin 17 extends loosely through the downwardly extending barrel or bearing member $18^a$ of a horizontal plate 18, said plate being secured to the upper sides of the reach bars 1. Within the bifurcation of the head $17^a$ is pivoted the lower end of an upwardly extending and normally rearwardly inclined steering post 19. This steering post is tubular in form and as shown more clearly in Fig. 3 of the drawing, is adapted to have telescoped therein a smaller tubular section 20. This section 20 has its upper portion externally threaded and has secured to such threaded portion a steering handle bearing head 21 over which passes the central portion of a yoke-shaped steering handle 22. The upper end of the tubular body 19 has screwed therein a ring 23, through which is adapted to slide the steering post section 20. The lower end portion of this inner steering post section is provided with an external ring 24, which is adapted to slide within the tubular section 19. In order to normally retain the section 20 within the steering post body 19, I secure to the upper portion of the latter, a spring catch piece 25, the upper angular end portion of which is adapted to spring into engagement with an external shoulder of the handle bearing member 21. In order to prevent a rotation of the internal steering post member 20, I provide the upper portion thereof with a laterally projecting pin 26, the outer end portion of which bears in a notch or recess 27 in the upper end of the post section 19.

28 represents a vehicle body, which may be of the oblong box form shown and which is supported upon the rear portions of the reach bars in any suitable manner. From this body projects forwardly a bracket arm 29, through which passes loosely and vertically the lower portion of a seat post 30, said seat post having its upper end provided with a suitable form of seat 31. The seat post 30 is adjustably supported in the bracket arm 29 through the medium of a set screw 32, which passes through a threaded opening in said bracket and engages the periphery of said post. Connected with the upper portion of the post 30 is the rear end of a forwardly extending frame bar 33, the forward end of the latter being provided with an enlargement or head 33ª which is recessed on its outer face to form a bearing for the steering post 19. This steering post is normally latched in connection with the head 33ª through the medium of a hook-shaped catch member 34 which is pivotally connected with the head 33ª, the curved finger extension of which is held in engagement with the outer side of the steering post through pressure of a spring 35 which is between the rear end of the catch member 34 and the head 33ª. With the outer end portion of the frame arm or rod 33 is connected the upper end of a vertical frame rod 36, the lower end of said last named frame rod being adjustably supported in the upturned socket member 18ᵇ of the plate 18, this adjustment being effected through the medium of a set screw 37 which passes through the threaded opening in said socket member and is adapted to engage the periphery of the frame member 36.

Between hangers which depend from the reach bars 1 is journaled a short shaft 38 which is provided with depending crank members 39 which are adapted to be engaged by the feet of a rider of the vehicle. The shaft 38 carries a sprocket wheel 40 which is connected with the rear sprocket wheel 6 by an endless driving chain 41.

In constructing a detachable seat for the vehicle or wagon bed, I provide upright seat side members 42, which intermediate of their heights are connected by a seat board 43 and back board 44. The extended lower portions of these seat members 42 bear upon the side members of the box-like bed 28 and the rear portion of each of the members 42 is provided with a fixed downwardly extending pin 45 which is adapted to enter a socket in the upper side of the corresponding side frame member of the body 28. The forward portion of each of said seat frame members 42 has depending from its inner side a fixed catch plate 46, the latter having a notch on its forward side adapted to engage a pin 47 which projects inwardly from the corresponding side of the body 28.

When the parts are in the position shown in full lines in the drawing, it is obvious that the vehicle may be propelled by the occupant of the seat 31 by pressing the feet on the pedal attachments of the cranks 39 and that the steering of the vehicle may be accomplished by turning the handle bar 22, thereby turning the steering post and so swinging the steering frame as to turn the forward wheels of the vehicle in the desired direction.

In case it is desired to draw the vehicle by hand, it is obvious that the catch member 34 may be moved to the released position, thereby permitting of the steering post being swung to the position indicated in dotted lines in Fig. 1 of the drawing, in which position said steering post may be utilized as a tongue or drawing bar. In order to facilitate the use of the steering post as a tongue or for the purpose of increasing the length of the steering post, it is obvious that the spring catch 25 may be moved out of engagement with the shoulder of the head 21 and the inner steering post extension member drawn outward, as shown by the dotted lines. It is obvious that the outward movement of this inner steering post member, will be limited by the contact of the collar 24 with the collar 23.

In order to adjust the seat to a desired height, it is only necessary to temporarily release the set screws 32 and 37 and move the connected frame members 33, 36 and the post 30 upward or downward and again tightening said set screws.

When desired, it is evident that the rear side frame may be removed from the box or body 28, by first raising the rear portion of said side frame until its pin 45 is out of engagement with the socket of the body, then disengaging the members 46 from the pins 47.

From the construction which I have shown and described, it is obvious that a comparatively simple although strongly constructed child's vehicle is provided, which may be readily converted from a foot propelled vehicle to a hand drawn vehicle.

Although particularly designed for children, it is obvious that a construction such as herein described, will be of great value as a vehicle for carrying or delivering goods of any character inasmuch as the bed or body 28 may be utilized as a container for goods to be delivered.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim, is:

1. In a vehicle, the combination with the framework, axles and ground wheels, of a jointedly connected steering frame connected with the front axle, a steering post connected with said steering frame, said steering post comprising upper and lower sections pivotally connected one with the other, and means for detachably locking the upper steering post section in connection with the vehicle framework.

2. In a vehicle, the combination with a horizontal reach frame, rear and front axles, ground wheels carried by said axle, a sprocket wheel on the rear axle, a sprocket wheel journaled from the reach frame, a crank shaft carried by said sprocket wheel, and a chain connecting said sprocket wheels, of a yoke bar in the ends of which the front axle is journaled, a bolt having a pivotal connection with said yoke bar at one end and a pivotal connection with said reach frame at the other, a jointed steering frame carried by said bolt, a lower steering post section connected with said steering frame, an upper steering post section pivotally connected with said lower steering post section, and means for detachably locking the upper steering post section into engagement with the framework of the vehicle.

3. In a vehicle, the combination with the vehicle frame, front and rear axles and ground wheels, and means for rotating the rear axle, of a steering frame having a movable connection with the front axle, a lower steering post section connected with said steering frame, an upper steering post section of tubular form pivotally connected with said lower section, an inner sliding steering post section within said upper section, means for detachably locking the steering post in an upright position, and means for latching the inner steering post member against outward movement.

In testimony whereof I affix my signature in presence of two witnesses.

COLONEL E. FOURMAN.

Witnesses:
A. L. PHELPS,
L. CARL STOUGHTON.